Nov. 8, 1955 R. A. STEPHENSON 2,722,866
COPYING TOOLS
Filed Feb. 14, 1952 3 Sheets-Sheet 1

Inventor
Robert Alfred Stephenson
By
Stevens, Davis, Miller & Mosher
His Attorneys

United States Patent Office 2,722,866
Patented Nov. 8, 1955

2,722,866

COPYING TOOLS

Robert Alfred Stephenson, Blaby, England, assignor to Power Jets (Research and Development) Limited, London, England, a British company Application February 14, 1952, Serial No. 271,566

Claims priority, application Great Britain February 15, 1951

4 Claims. (Cl. 90—13.2)

In a simple form of copying tool for machining an article or part of an article to a shape which is an accurate copy of a solid pattern, the tool, e. g. a cutting tool such as a milling cutter, rigidly carried by a movable tool carrier is guided over the correct shape in space by a stylus, also rigidly mounted on the tool carrier, which moves over a corresponding part of the surface of the pattern.

The object of the present invention is to provide a simple attachment which, when used with a multi-spindle drilling machine or vertical milling machine having a tool on one spindle and a stylus on a second spindle, will convert this machine into a copying machine of the aforesaid kind and the invention is particularly useful for machining the leading and possibly the trailing edges of turbine or axial compressor blades to accurate shape by copying an accurately formed pattern.

The machine has of course a traversing work table, the two spindles being spaced along the direction of traverse. The attachment according to the invention consists of a base plate which can be mounted on the work table of the machine with its length lying along the direction of traverse and with its width accordingly lying across this direction, a movable work carrier mounted on the base plate for movement across the width of the base plate, holders on said carrier for holding the work and the pattern in correct location relatively to the tool and the stylus respectively and means urging the work carrier to move across the base plate to press the pattern against the stylus and the work against the tool.

A further feature consists in a work carrier including a pivoted cradle by which the pattern and the work in the holders can be located about an axis along the length of the base plate for causing the stylus to run over the edge of the pattern.

Figure 1:
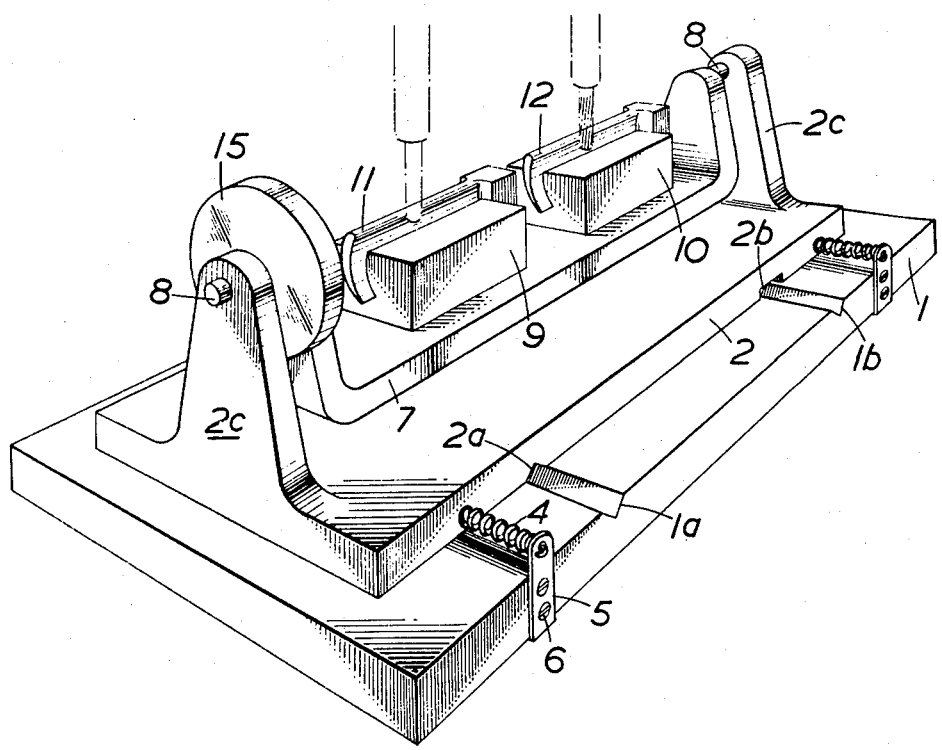
Figure 2:
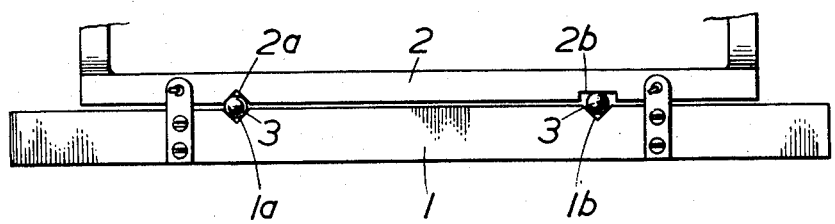
Figure 3:
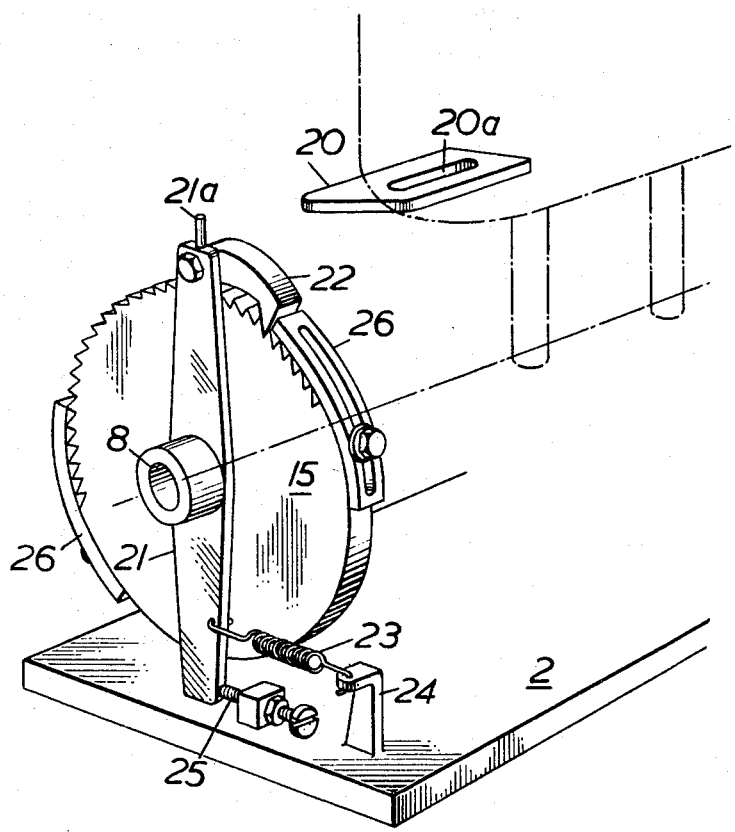
Figure 4:
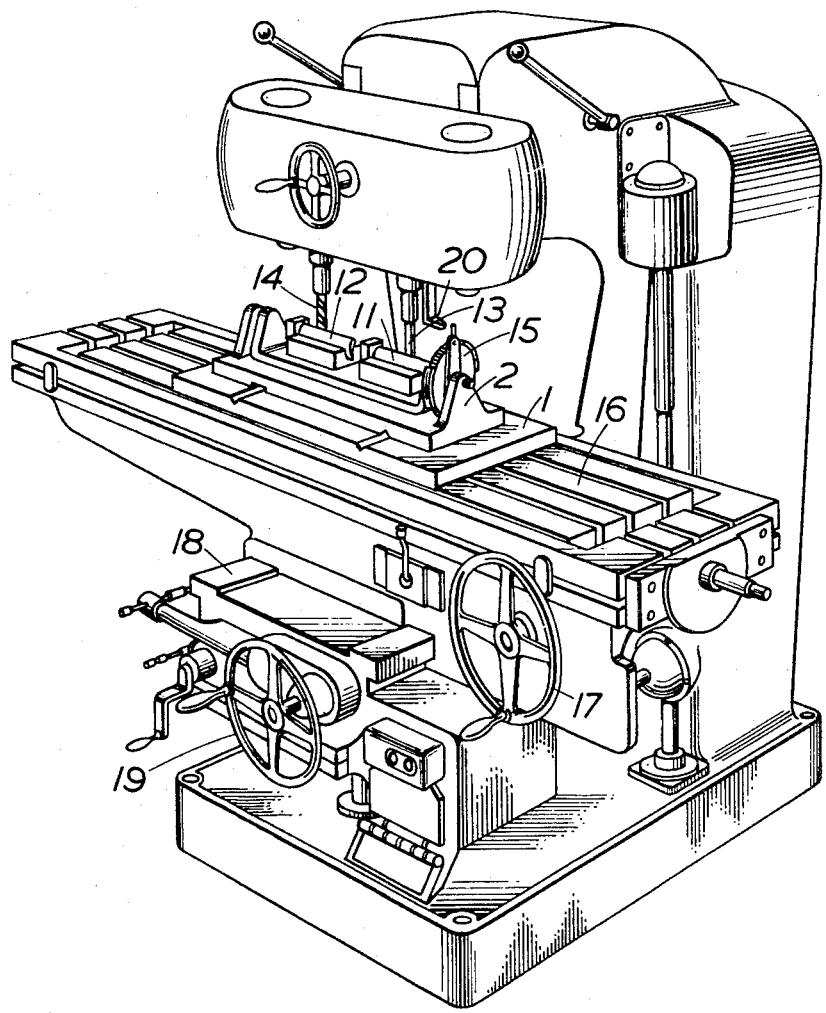

One particular form of attachment according to the invention is shown in Figure 1 of the accompanying drawing of which Figure 2 is a detail of the anti-friction mounting of the work carrier of the base plate, Figure 3 is a detail of the automatic ratchet operated feed mechanism, and Figure 4 is a view showing the atachment in position on a multi-spindle vertical milling or drilling machine.

In Figure 1 a base plate 1, which can be clamped to the main table of the machine, supports a carrier bracket 2 consisting of a base with lugs 2c standing up at each end of its length. Carrier bracket 2 is mounted for movement on the baseplate 1 transversely to their length and almost frictionlessly against a biassing force. The anti-friction mounting is shown in Figure 2, and consists of balls 3 running in two V tracks 1a and 1b across base palte 1. A corresponding V groove 2a in the underside of carrier bracket 2 fits over the balls in track 1a whereby the bracket 2 is both supported and located on the base plate 1. A rectangular groove 2b in the bracket 2, wider than the track 1b, has its bottom part resting on the balls in that track. The biassing force is applied by tension springs 4 between the edge of the carrier bracket 2 and bracket 5 attached by screws 6 fixed to the base plate 1. Alternatively the biassing force could be applied by attachment to the carrier bracket 2 of a weighted cord or cords, each passing over a pulley.

On the carrier bracket 2 is a work-carrier in the form of a cradle 7 pivotally mounted at each end on the two lugs 2c by pivot pins 8. The cradle 7 carries clamping saddles 9 and 10 whereby the pattern 11 and the work piece 12 can be mounted in alignment correctly relatively to the two vertical spindles of the machine, shown in broken lines in Figure 1. The pattern 11 and workpiece 12 are shown as turbine blades mounted with their leading edges exposed to the stylus and the tool.

A wheel 15 attached to the cradle 7 at one end allows it to be rocked about the pivotal centres. Although, if sufficient friction be provided to keep the cradle 7 in the angular position to which it is adjusted by the wheel 15, the latter could be a knurled knob for hand operation, preferably it is, as shown in detail in Figure 3, a ratchet wheel, operated by mechanism described later. The turbine blades 11 and 12 forming the pattern and the work are so mounted that the pivotal axis of the cradle 7 more or less coincides with the centre of curvature of the leading edge of the blade and the pressure of the stylus and tool against the pattern and the work will have almost no turning moment about the pivotal axis of the cradle.

The pattern is a blade on which at least the leading edge has been accurately finished by hand. The pattern is usually treated by hard-chrome plating of the leading edge, to prevent undue wear, and once it is secured in its clamping saddle it is not removed again until a set of blades has been completed. The clamping saddles are of conventional form and as used commonly in machine tool attachments and need not be described in detail.

Referring to Figure 4 the stylus is shown at 13 mounted on one spindle of the machine on the head of the machine and the tool is indicated at 14 as a milling cutter mounted on the other spindle of the machine. The traversing work table of the machine is shown at 16 and the traverse handle at 17. The table 16 is mounted on a slide 18 for cross traversing movement the cross traverse handle being shown at 19. The base plate 1 is mounted on the work table 16 as shown with the pattern 11 facing the stylus 13 and the workpiece 12 facing the milling cutter 14.

For imparting angular movement to the cradle 7 by means of the wheel 15 at the end of each traversing motion there is provided ratchet mechanism actuated by the cam 20 which, as can be seen in Figure 4, is adjustably mounted on the head of the machine by means of a bolt through the slotted hole 20a. The complete ratchet device is shown in detail in Figure 3 as consisting of the wheel 15 provided with ratchet teeth around its rim which would be only enough for approximately half a revolution. Independently mounted on the pivot pin 8 is the pawl lever 21 carrying the pivoted pawl 22 engaging the ratchet teeth. Projecting up from the pawl lever 21 is the tappet 21a which, at the end of the traversing movement, comes into engagement with the inclined face of the cam 20. A biassing spring 23 between the pawl lever 21 and a projection 24 on the carrier bracket 5 holds the pawl lever against the adjustable screw stop 25. Tooth guards 26 are adjustably mounted by means of bolts through slotted holes therein which attach them to the wheel 15.

In operation, the cross traverse of the machine is used to bring the work carrier bracket 2 towards the head of the machine until the stylus 13 engages the pattern 11 or the milling cutter 14 engages the workpiece 12. Further such movement exerts extra pressure on pattern or workpiece and moves the carrier bracket 2 across the base plate 1 against the biassing force of the springs 4. This movement is continued until the pressure exerted is the desired pressure of tool against work for the machining operation. With the milling cutter in action the operator can then operate the traverse of the machine to cause the stylus and tool to traverse the edge of the model and workpiece respectively, while the ratchet feed device gives regular angular movement to the cradle 7 and so moves the stylus and tool over the edge of the blades.

For the latter purpose the tappet 21a projecting from the pawl lever 21 is engaged at the end of each stroke by cam 20 and moved against the force of the biassing spring 23 through an angle corresponding to one or more ratchet teeth; during the return stroke, the spring 23 returns the lever 21 and rotates the wheel 15 through a corresponding distance. The starting and stopping positions of the cuts around the edge of the blade are determined by the positions in which the tooth guards 26 are set.

What I claim is:

1. An attachment for enabling a multi-spindle vertical milling machine or drilling machine having a traversing worktable, a cylindrical cutting tool on one spindle and a similarly shaped stylus on another spindle, spaced along and having their axes at right angles to the direction of traverse, to be used to machine some part of a work-piece to a shape which is a copy of a pattern over which the stylus moves, which attachment consists of a baseplate which can be fastened on the worktable of the machine with its length lying along and its width lying across the direction of traverse, a movable work-carrier mounted on the baseplate for movement across the width of the baseplate at right angles to the axis of the cutting tool, holders on said work-carrier for holding the workpiece and the pattern in correct location tangentially to the tool and the stylus respectively, and means urging the work-carrier to move across the baseplate to press the pattern against the cylindrical face of the stylus and the work against the cylindrical face of the tool.

2. An attachment for enabling a multi-spindle vertical milling machine or drilling machine having a traversing worktable, a cylindrical cutting tool on one spindle and a similarly shaped stylus on another spindle, spaced along and having their axes at right angles to the direction of traverse, to be used to machine some part of a work-piece to a shape which is a copy of a pattern over which the stylus moves, which attachment consists of a baseplate which can be fastened on the worktable of the machine with its length lying along and its width lying across the direction of traverse, a movable work-carrier mounted on the baseplate for movement across the width of the baseplate at right angles to the axis of the cutting tool, holders on said workcarrier for holding the workpiece and the pattern in correct location tangentially to the tool and the stylus respectively, means urging the work-carrier to move across the baseplate to press the pattern against the cylindrical face of the stylus and the work against the cylindrical face of the tool, a cradle for supporting said holders mounted on said carrier and angularly displaceable with respect thereto about an axis extending in the direction of traverse, and means for maintaining unchanged the angular displacement of said cradle relatively to said carrier during each operative traversing motion of the work relatively to the cutting tool and for automatically modifying said angular displacement between successive operative traversing motions.

3. A copying tool for machining some part of a workpiece to a shape which is a copy of a solid pattern and which consists in the combination of a worktable mounted for main and cross traversing movements, a head, two spindles depending from said head and spaced along the direction of main traverse and with their axes at right angles to the direction of said traverse and a cross traverse thereto, a cylindrical tool on one of said spindles and a similarly shaped stylus on the other, a work-carrier on the worktable movable, relatively to the table, across the direction of main traverse towards and away from the spindles in a direction at right angles to their axes, and means for applying a biassing force to the work-carrier in a sense acting in opposition to the movement of the work-carrier across the worktable when, by the cross traverse, the workpiece and pattern are pressed tangentially against the cylindrical faces of the tool and the stylus respectively.

4. A method of milling the rounded edge of a blade such as a turbine or an axial flow compressor blade, consisting of maintaining the blade to be milled and a pattern forming the basis for the milling operation on the blade in spaced relationship longitudinally of the blade, cross traversing the blade and pattern as a unit in a direction transverse to the blade length to bring said blade and pattern into tangential peripheral contact respectively with a cylindrical cutting tool and a similarly shaped stylus, longitudinally traversing the blade and pattern as a unit relatively to the cutting tool and stylus while maintaining contact between the tool and the blade and between the stylus and pattern and, at the end of said traverse, angularly displacing said blade and pattern as a unit about an axis extending longitudinally of the blade.

References Cited in the file of this patent

UNITED STATES PATENTS

| | | |
|---|---|---|
| 1,925,025 | Amann | Aug. 29, 1933 |
| 2,113,716 | Berliner | Apr. 12, 1938 |
| 2,511,956 | Wetzel | June 20, 1950 |
| 2,600,481 | Clyde | June 17, 1952 |